United States Patent
Takeuchi et al.

(10) Patent No.: US 7,391,953 B2
(45) Date of Patent: Jun. 24, 2008

(54) CAPILLARY TUBE FOR HOLDING OPTICAL FIBER AND CONNECTING STRUCTURE FOR OPTICAL COMPONENT

(75) Inventors: Hirokazu Takeuchi, Shiga-ken (JP); Nobuo Funabiki, Shiga-ken (JP); Sotohiro Nakajima, Shiga-ken (JP)

(73) Assignee: Nippon Electric Glass Co., Ltd., Shiga-Ken (JP)

( * ) Notice: Subject to any disclaimer, the term of this patent is extended or adjusted under 35 U.S.C. 154(b) by 0 days.

(21) Appl. No.: 11/703,173

(22) Filed: Feb. 7, 2007

(65) Prior Publication Data

US 2007/0189698 A1    Aug. 16, 2007

(30) Foreign Application Priority Data

Feb. 8, 2006    (JP)    .............................. 2006-031276

(51) Int. Cl.
G02B 6/00    (2006.01)
G02B 6/26    (2006.01)

(52) U.S. Cl. .......................................... 385/137; 385/50

(58) Field of Classification Search ....................... None
See application file for complete search history.

(56) References Cited

U.S. PATENT DOCUMENTS 6,322,256 B1 *   11/2001   Inada et al. ................... 385/84
6,637,948 B2 *   10/2003   Shirai et al. ................... 385/92

* cited by examiner

Primary Examiner—M. R. Connelly-Cushwa
Assistant Examiner—Omar Rojas
(74) Attorney, Agent, or Firm—Wenderoth, Lind & Ponack, L.L.P.

(57) ABSTRACT

A glass capillary tube 1 is connected and fixed in a straight line to an optical component 5 having a substantially rectangular cross-section perpendicular to an optical axis 4a. Moreover, a top-surface side end portion 9 and a rear-surface side end portion 8 of an exterior surface 7 of the glass capillary tube 1 are positioned at the same level as the top surface and the rear surface of the exterior surface of the optical component 5 in the height-wise direction, respectively, while the central axis of an insertion hole 3, which is provided in the glass capillary tube 1 and into which an optical fiber 2 is inserted and fixed, is matched with the optical axis 4a of the optical component 5.

15 Claims, 6 Drawing Sheets

CAPILLARY TUBE FOR HOLDING OPTICAL FIBER AND CONNECTING STRUCTURE FOR OPTICAL COMPONENT

FIELD OF THE INVENTION

The present invention relates to a capillary tube for holding an optical fiber and a connecting structure for an optical component, and in particular to a technique for appropriately connecting and fixing a capillary tube for holding the optical fiber, in which one or a plurality of insertion holes are formed into which the optical fiber is inserted and held, to an optical component such as an optical waveguide device.

BACKGROUND OF THE INVENTION

As is commonly known, a glass capillary tube for holding an optical fiber (hereinafter, glass capillary tube), in which an insertion hole is formed into which the optical fiber is inserted and held, is used for holding the optical fiber in alignment with the optical axis of an optical component such as an optical waveguide-typed device. The glass capillary tube is fixed to an end surface of the optical component in a straight line in such a way that the central axis of the insertion hole and the optical axis of the optical component are precisely positioned. In this case, both the optical component and the glass capillary tube are usually provided on the same flat surface of a substrate (or casing or holder).

As specific examples, patent document 1 below discloses a glass capillary tube of which the exterior surface is substantially rectangular in shape (composed of four flat portions) and of which a central insertion hole, into which a single-core optical fiber is inserted and held, is formed, and an optical component connected to the glass capillary tube in a straight line. According to the patent document 1, the positioning of the optical axis of the optical fiber inserted into and held by the insertion hole and the optical axis of the optical component are determined by utilizing the flat portions on the exterior surface of the glass capillary tube.

Patent document 2 below discloses a glass capillary tube of which the exterior surface is composed of a single flat portion and a single partial cylindrical portion and in which an insertion hole for inserting and holding an optical fiber corresponding to the central axis of the partial cylindrical portion is formed, and a rectangular optical waveguide device connected to the glass capillary tube in a straight line. According to the patent document 2, in the state where an auxiliary member is fixed to the upper surface of the connecting end of the optical waveguide device, the optical waveguide device and the glass capillary tube are connected and fixed.

Patent document 3 below discloses an optical waveguide device, of which the cross-section is approximately circular in shape, and a ferrule, of which the cross-section is approximately circular in shape for holding an optical fiber, provided such that the respective end surface of the two are connected and held in an inner opening of a single sleeve, and an insertion hole in the ferrule into which the optical fiber is inserted and held is formed in a position deviated (de-centered) from the center of the ferrule.

[Patent Document 1] Japanese Unexamined Publication No. 2001-318270

[Patent Document 2] Japanese Unexamined Publication No. 2003-287651

[Patent Document 3] Japanese Unexamined Publication No. H2-236508

SUMMARY OF THE INVENTION

In general, an optical axis (core) of an optical waveguide device is not formed at the center in a height-wise direction of the device, while an insertion hole of a glass capillary tube is generally formed on the central axis of the capillary tube. As described in the above patent document 1 (FIG. 2(B) thereof), when the optical waveguide device and the glass capillary tube are mounted on the same flat surface, a height difference is generated between a surface (top surface) of the optical waveguide device and a surface (top surface) of the glass capillary tube. Under this situation, when the optical waveguide device and the glass capillary tube are connected and fixed, and are packaged by covering the peripheries with a casing, the height difference causes gap formation above the optical waveguide device. In addition, due to the presence of the gap, saccadic movements are generated, and moreover even when the gap is filled with an adhesive or a spacer is interposed in order to reduce the saccadic movements, a difference in thermal expansion or the like between the adhesive or the spacer and the optical waveguide device generates an improper stress, thereby leading to early deterioration.

In contrast to this, an auxiliary member is fixed to the upper surface of the connecting end of the optical waveguide device disclosed in the above patent document 2. Thus, a rear-surface side end portion of the glass capillary tube and a rear surface of the optical waveguide device can be positioned at the same level, and a top-surface side end portion of the glass capillary tube and an upper end surface of the auxiliary member can be positioned at the same level. However, when the optical waveguide device and the glass capillary tube are packaged by a casing, saccadic movements are prevented only on the connecting end of the optical waveguide device. Considering the entire optical waveguide device, there is a height difference between most regions of the top surface of the optical waveguide device and the top surface of the auxiliary member as shown in FIG. 9 of the document. Therefore, even by the structure disclosed in the patent document 2, the height difference causes a problem such as early deterioration, as in the structure disclosed in the aforementioned patent document 1.

In addition, in the connecting method for optical waveguide disclosed in the above patent document 3, the ferrule and the optical waveguide device have to be relatively rotated so as to align the insertion hole of the optical fiber, which is formed in a position deviated from the ferrule having an approximately circular cross-section, with the core (optical waveguide), which is formed to be deviated from the optical waveguide device having an approximately circular cross-section. Moreover, the relative rotational angle of the insertion hole and the core must be precisely adjusted, and furthermore the handling of the insertion hole and the core is inconvenient and thus troublesome and complicated aligning work is required, thereby leading to a problem of significantly decreasing workability or operating efficiency. In addition, when both are required to be mounted on the same flat surface in terms of layout or the like, there arises a fatal problem that both cannot be firmly mounted with stability.

In light of the aforementioned circumstances, technical objects of the present invention are to achieve the aligning work between the optical component such as the optical waveguide device and the capillary tube by a simple operation, and respond to the request of appropriately mounting the optical waveguide device and the capillary tube on the same flat surface, and significantly decrease a height difference between the optical component and the capillary tube when both are connected, fixed, and mounted on the same flat surface, and thus both can be packaged by the casing without leading to saccadic movement and early deterioration.

In order to solve the above technical problem, the present invention is characterized by a capillary tube for holding an optical fiber which is connected and fixed in a straight line to an optical component having a substantially rectangular cross-section that is perpendicular to an optical axis and in which an insertion hole, into which the optical fiber is inserted and fixed, is formed. A top-surface side end portion and a rear-surface side end portion of an exterior surface are formed to be positioned at the same level as a top surface and a rear surface of an exterior surface of the optical component in a height-wise direction, respectively, while the central axis of the insertion hole and the optical axis of the optical component are matched. In this case, the "optical component having a substantially rectangular cross-section that is perpendicular to an optical axis" includes not only the case where the periphery of the optical component consists of four surfaces and the adjacent four surfaces are connected thereto via each right-angle corner, but also the case where a chamfering process such as round chamfering is applied to each corner. In addition, the insertion hole, into which the optical fiber is inserted and fixed, may be provided as a single insertion hole or multiple insertion holes and thus the optical axis (core) of the optical component may also be provided as a single axis (core) or multiple axes (cores).

According to the structure, since the optical component of the optical waveguide device or the like has a substantially rectangular cross-section, even when the capillary tube, which is connected and fixed to the optical component in a straight line, has a substantially circular cross-section as well as when the rear-surface side end portion of the capillary tube is a flat portion, these can be mounted on the same flat surface with stability by effectively utilizing the flat portion of the optical component in connecting and fixing them to each other. Moreover, since the aligning of the optical component and the capillary tube can be performed while the optical component is being held with stability, the handling of these does not become inconvenient, and hence the aligning can be relatively easily achieved. Furthermore, under the circumstances where the insertion hole of the capillary tube (particularly, the optical axis of the optical fiber which is inserted and fixed to the insertion hole) is approximately aligned with the optical axis of the optical component, the top-surface side end portion and the rear-surface side end portion of the exterior surface of the capillary tube are formed to be at the same position in the height-wise direction as the top surface and the rear surface of the exterior surface of the optical component, respectively. Therefore, when the optical component and the capillary tube are mounted on the same flat surface while being connected and fixed to each other, the height difference between the top surface of the optical component and the top-surface side end portion of the capillary tube is less likely to occur. Therefore, when these are packaged with the casing, the generation of a gap is prevented and thus the generation of saccadic movements is prevented. In addition, the problems of the generation of improper stress, which is due to the difference in thermal expansion caused by filling the gap with an adhesive or the like, and the early deterioration due to the generation of the stress, are solved.

In this case, at least one of the top-surface side end portion and the rear-surface side end portion of the exterior surface serves as a flat portion, and the flat portion has one or more partial cylindrical portions which are continuously connected to the flat portion, and moreover all the partial cylindrical portions are formed from a single central axis and with the same radius. In addition, the insertion hole can be formed in a position deviated from the central axis in the height-wise direction.

According to such structure, since the single or plurality of partial cylindrical portions on the exterior surface of the capillary tube are formed from a single central axis and with the same radius, the capillary tube can be adequately held by a jig with a simple structure during the skewing process of the end surface at the final stage of production of the capillary tube after the exterior surface is formed into the above predetermined shape. Particularly, since the single or plurality of partial cylindrical portions are formed on the exterior surface of the capillary tube and all the partial cylindrical portions are formed from a single central axis and with the same radius, when for example, each contact surface of a pair of jigs is formed such that both can extend from the same central axis and with the same radius during actual gripping, the pair of jigs can be in surface contact with all the partial cylindrical portions. As in this example, since the jig with a simple shape can be in surface contact with the exterior surface of the capillary tube without increasing the parts count, the structure of the jig becomes extremely simple and the cost of production thereof decreases. In addition, with surface contact, the probability of chipping and breaking of the capillary tube can be significantly reduced. Further, since the insertion hole in the capillary tube deviates from the central axis in a height-wise direction, the position of the optical axis of the optical component (for example, optical waveguide device) and the position of the insertion hole in the capillary tube can be aligned by changing the degree of such deviation. Therefore, the dimension of, for example, the flat portion in the width-wise direction or the shape of the exterior surface of the capillary tube are not readily restricted by the structure of the optical component, and hence the capillary tube can be stably provided on the base plane by forming the exterior surface into a required shape. In addition, even when the adhering end surface of the optical component is rectangular or substantially rectangular in shape, the adhering area between the capillary tube and the optical component can be sufficiently secured and a precise adhering strength can be achieved. Moreover, since the capillary tube includes the flat portion, the capillary tube will not rotate around the central axis. Moreover, since the insertion hole is formed at a position deviating from the central axis in a direction perpendicular to the first flat portion, which serves as a benchmark, such that the optical axis of the optical component is matched with the central axis of the insertion hole of the capillary tube, the core of the optical component and the core of the optical fiber held in the insertion hole of the capillary tube are in a state of approximate alignment. Even when not in alignment, the deviation will be small and the alignment process can be readily performed by a mere slight adjustment.

It is preferable that the insertion hole is formed at a position deviated from the center between the top-surface side end portion and the rear-surface side end portion of the exterior surface in the height-wise direction.

Accordingly, using as a benchmark the center between the top-surface side end portion and the rear-surface side end portion in the height-wise direction of the exterior surface of the capillary tube, since the insertion hole is formed at a position deviated from such center in the height-wise direction, when the optical axis (core) of the optical component rigidly connected to the capillary tube in a straight line is provided at a position deviated from the center in the height-wise direction, such as the optical waveguide device for example, the central axis of the insertion hole of the capillary tube and the optical axis of the optical component can be approximately matched, and the top-surface side end portion and the rear-surface side end portion of the exterior surface of the capillary tube can be positioned at the same level as the top surface and the rear surface of the exterior surface of the optical component in the height-wise direction, respectively. Note that the optical axis of such optical component is generally deviated to the top-surface side (upper side) from the center in the height-wise direction, and thus the insertion hole of the capillary tube is also preferably deviated to the top-surface side from the center in the height-wise direction.

Moreover, for the exterior surface of the capillary tube, it is preferable that the rear-surface side end portion serves as a first flat portion and the top-surface side end portion serves as a second flat portion parallel to the first flat portion.

With this structure, since the adhering end surface to the capillary tube of the optical component is substantially rectangular, the first and second flat portions of the capillary tube can be aligned with upper and lower edges of the end surface, respectively. By doing so, the adhering area between the optical component and the capillary tube is effectively enlarged and the saccadic movements and early deterioration, which occur when packaging with the casing, can be effectively suppressed.

It is preferable that the capillary tube having the above structure is composed of a material with a thermal expansion coefficient of 0 to $80 \times 10^{-7}$/K under an operating temperature range.

Accordingly, not only can problem such as thermal deformation of the capillary tube be adequately suppressed, but adverse effect on the adhering portion between the capillary tube and the optical component due to changes in temperature is also not likely to occur, and an excellent optical characteristic can be maintained.

Further, although the capillary tube having the above structure can be made of ceramics, plastics, metal or the like, it is preferable that the capillary tube is composed of a glass material. This is because for a glass capillary tube, the polishing process of the connecting portion can be easily performed and an ultraviolet curable adhesive can be used, and hence assembly costs can be reduced. In addition, since drawing process technology can be adopted for production, production costs can also be reduced. Moreover, compositions having the same thermal expansion coefficient as the optical fiber can also be utilized. For the glass material, borosilicate glass, quartz glass, and crystallized glass in the $Li_2O$—$Al_2O_3$—$SiO_2$ system can be used, but borosilicate glass is particularly preferable.

It is preferable that the glass capillary tube having the above structure is produced by a drawing process.

In this manner, when the glass capillary tube is produced by the drawing process, since all the partial cylindrical portions are formed from a single central axis and with the same radius, even when a deviation around the central axis occurs due to the positioning of the glass capillary tube during the measuring of the external diameter by a laser in the drawing process, the external diameter of the glass capillary tube measured will never change regardless of the deviation of positioning. Without such structure, when a deviation around the central axis X occurs as the glass capillary tube 1A is in a position as illustrated in FIG. 10, the measured width Wa of the exterior surface will be larger than the actual width W and the external diameter of the glass capillary tube 1A cannot be measured precisely. With the aforementioned structure, such a problem does not occur. Therefore, the external diameter of the glass capillary tube can be precisely measured, accurate dimension control of the drawing process can be maintained, and error or variation in the final external diameter of the formed glass capillary tube is not likely to occur.

On the other hand, the aforementioned optical component is preferably an optical waveguide device. In addition, the optical waveguide device is preferably an optical splitter in which an end surface on the single-core side is connected and fixed to the aforementioned capillary tube.

With this structure, the previously described various advantages can be more surely enjoyed.

In addition, the present invention intends to solve the aforementioned technical problem related to a connecting structure for an optical component which is formed by connecting and fixing in a straight line an optical component, which has a substantially rectangular cross-section perpendicular to the optical axis, and a capillary tube for holding an optical fiber having an insertion hole into which an optical fiber is inserted and fixed. The optical axis of the optical component and the central axis of the insertion hole of the capillary tube for holding the optical fiber are matched, and the top surface and the rear surface of an exterior surface of the optical component are connected to the top-surface side end portion and the rear-surface side end portion of an exterior surface of the capillary tube for holding the optical fiber, respectively, to be positioned at the same level in the height-wise direction.

According to such connecting structure, the top surface and the rear surface of the optical component are positioned at the same level in the height-wise direction as the top-surface side end portion and the rear-surface side end portion of the capillary tube, respectively, while the optical axis of the optical component having a substantially rectangular cross-section is aligned with the insertion hole of the capillary tube. Therefore, the same matter as the matter including the previously described effect is true for the structure corresponding to the connecting structure. Hence, herein the description of the effect is omitted for convenience.

Moreover, in this connecting structure, the periphery of the optical component and the capillary tube for holding optical fiber can be covered with a casing.

In this case, the same matter as the matter including the previously described effect is also true for the structure corresponding to this case, and hence, herein the description of the effect is omitted for convenience.

As described above, according to the present invention, when an optical component such as an optical waveguide device is connected and fixed to a capillary tube, these can be mounted on the same flat surface with stability, and moreover these can be relatively easily aligned while, being held with stability, avoiding disadvantages and inconveniences in handling. In addition, when the optical component and the capillary tube are mounted on the same flat surface while being connected and fixed to each other, a height difference between the top surface of the optical component and the top-surface side end portion of the capillary tube is less likely to occur. Therefore, when these are packaged with the casing, the generation of a gap is prevented and thus the generation of saccadic movements is prevented. In addition, the problems of the generation of the improper stress, which are due to the difference in thermal expansion caused by filling the gap with an adhesive or the like, and the early deterioration due to the generation of the stress, are solved.

DETAILED DESCRIPTION OF THE INVENTION

Hereinafter, embodiments of the present invention will be described with reference to the accompanying drawings.

Figure 1:
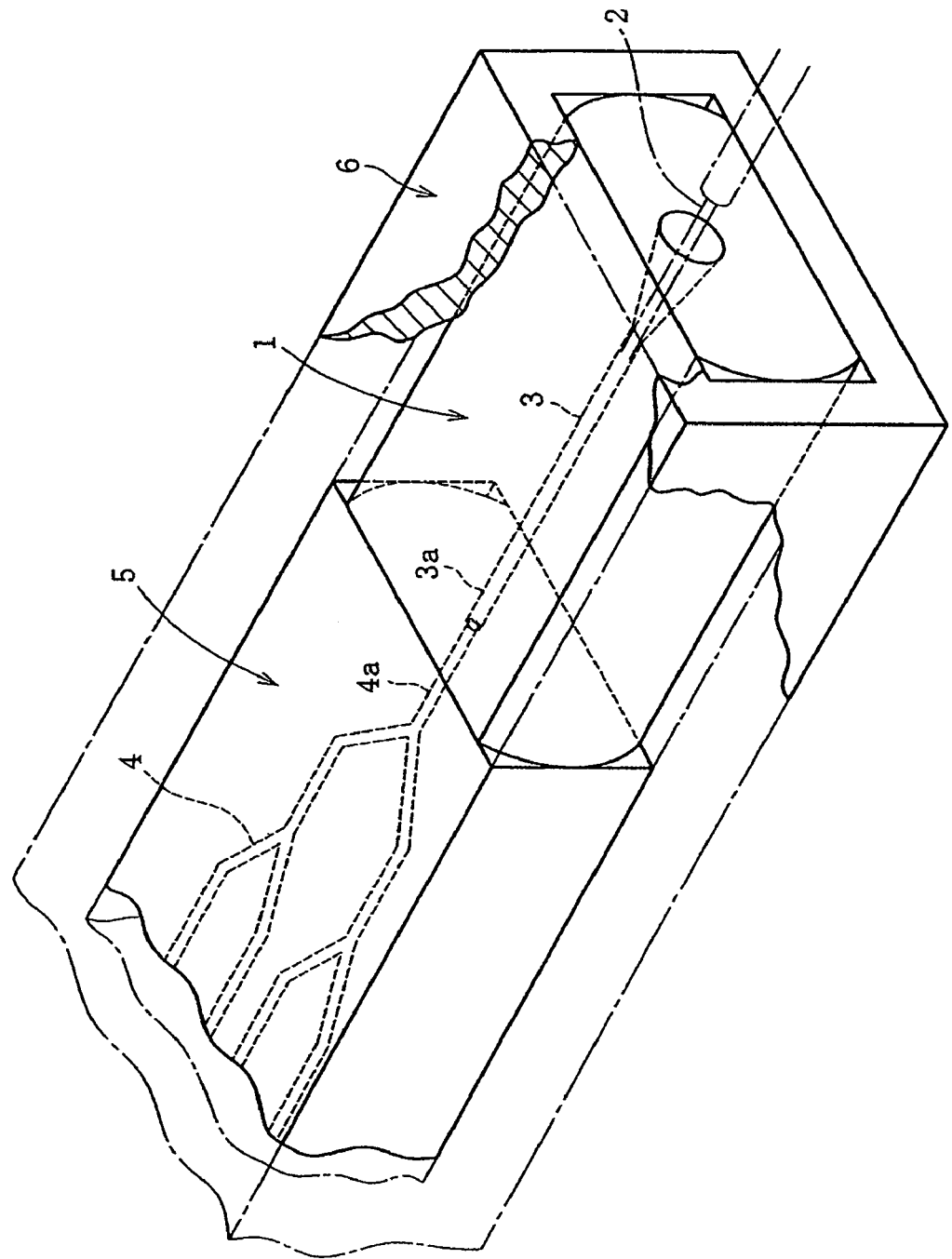
FIG. 1 is a perspective view illustrating a glass capillary tube for holding optical fiber and an overview of its periphery related to a first embodiment of the present invention.

FIG. 1 represents a glass capillary tube for holding optical fiber and an overview structure of an optical waveguide device as an optical component, which is connected and fixed to the glass capillary tube, related to a first embodiment of the present invention. As illustrated in the same drawing, a glass capillary tube 1 includes an insertion hole 3 through which a single-core optical fiber 2 is inserted and held within, and an optical waveguide device 5 serving as an optical component with a core 4 is firmly adhered to and in-line with an end (front end) of the optical fiber in the optical axis direction. The firmly adhered glass capillary tube 1 and the optical waveguide device 5 are packaged and housed within a casing (holder) 6. In this case, the front end 3a of the insertion hole 3 in the glass capillary tube 1 and the rear end 4a of the core 4 in the optical waveguide device 5 are pushed against and connected with each other in alignment at the adhering surface of the glass capillary tube 1 and the optical waveguide device 5.

Figure 2A:
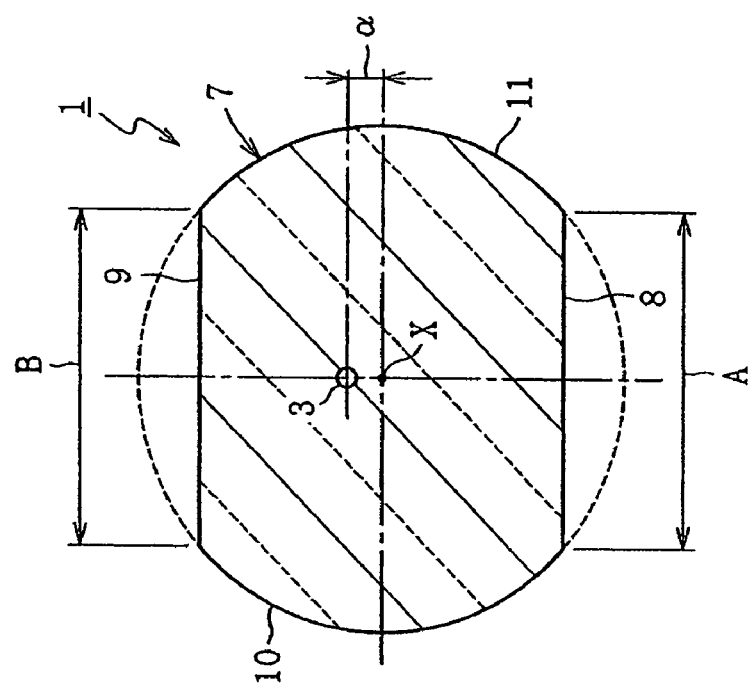
FIG. 2(a) is a front view of a vertical cross-section of the glass capillary tube for holding optical fiber related to the first embodiment.
Figure 2B:
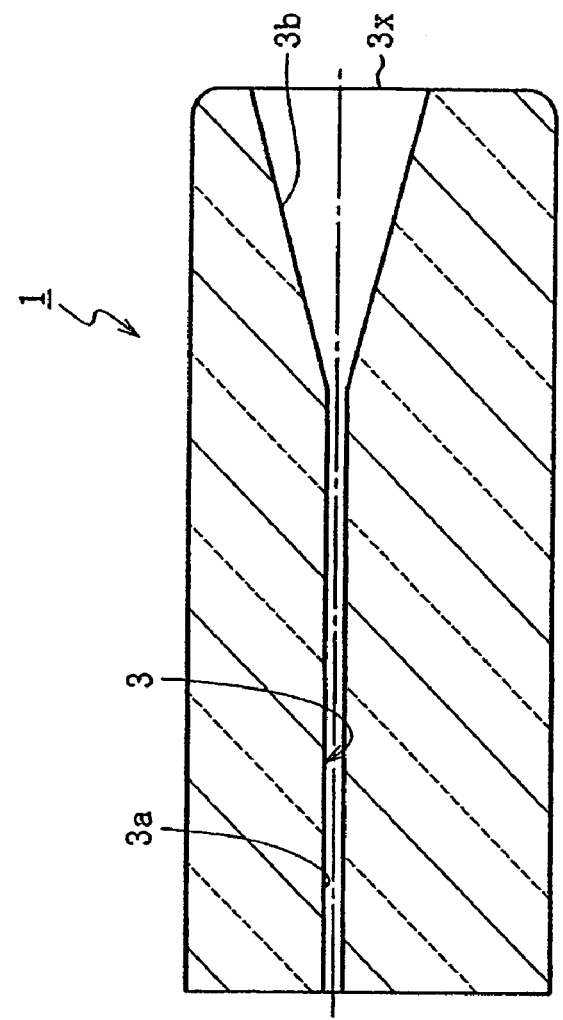
FIG. 2(b) is a side view of the vertical cross-section.

FIG. 2(a) is a vertical cross-sectional view in which the glass capillary tube 1 is cut at a right angle to the optical axis, and FIG. 2(b) is a vertical cross-sectional view in which the glass capillary tube 1 is cut along the optical axis. As illustrated in FIG. 2(a), the exterior surface 7 of the glass capillary tube 1 is composed of two flat portions 8, 9, which constitute a rear-surface side end portion and a top-surface side end portion, and two partial cylindrical portions 10, 11 connecting with the flat portions 8, 9. In particular, the exterior surface 7 is composed of a first flat portion 8, which serves as a benchmark, a second flat portion 9 parallel to the flat portion 8, a first partial cylindrical portion 10 connecting from an end of the first flat portion 8 in the widthwise direction to an end of the second flat portion 9 in the widthwise direction, and a second partial cylindrical portion 11 connecting from another end of the first flat portion 8 in the widthwise direction to another end of the second flat portion 9 in the widthwise direction. The first partial cylindrical portion 10 and the second partial cylindrical portion 11 are formed from the single-core central axis X and with the same radius, and the total region (total surface area) of the two partial cylindrical portions 10, 11 covers 20% or more (with upper limit at about 80%) of the entire region (entire surface area) of the exterior surface 7.

In this case, the above described insertion hole 3 (particularly the central axis of the insertion hole 3) is formed in a position deviated from the above described central axis X by a predetermined dimension a toward the second flat portion 9 side in the direction (height-wise direction) that is perpendicular to the first flat portion 8. In this embodiment, the dimension A of the first flat portion 8 in the widthwise direction is the same as the dimension B of the second flat portion 9 in the widthwise direction. Therefore, the above described insertion hole 3 is formed in a position deviated from the center (in this embodiment, the straight line that extends in the widthwise direction where the central axis passes through) of the first flat portion 8 and the second flat portion 9 in the height-wise direction by the same above described predetermined dimension a toward the second flat portion 9 side. Furthermore, the above described insertion hole 3 is formed at the center of the glass capillary tube 1 in the widthwise direction, and a flared portion 3b, which diameter gradually increases towards the rear end, is formed such that it smoothly connects the rear end of the insertion hole 3, as illustrated in FIG. 2(b). The diameter of a rear end opening portion 3x of the flared portion 3b is increased by three to eleven times of that of the front end portion 3a depending on the diameter (to be covered) of the optical fiber inserted. In the first embodiment, the rear end opening portion is increased by nine times.

The glass capillary tube 1 is made of borosilicate glass with thermal expansion coefficient of 30 to $70 \times 10^{-7}$/K under operating temperature range, and is produced by the drawing process. Furthermore, the glass capillary tube 1 has a light transmittance of 60% or more, in glass thickness of 1 mm for wavelength of 350 nm to 500 nm. In the case where the glass capillary tube is made of a glass material containing alkali ions, the glass capillary tube may be strengthened by generating a compressive stress layer on all the exterior surfaces by ion exchange. The Ra value of surface roughness on the first flat portion 8 and the second flat portion 9 is 0.1 μm or less.

Figure 3:
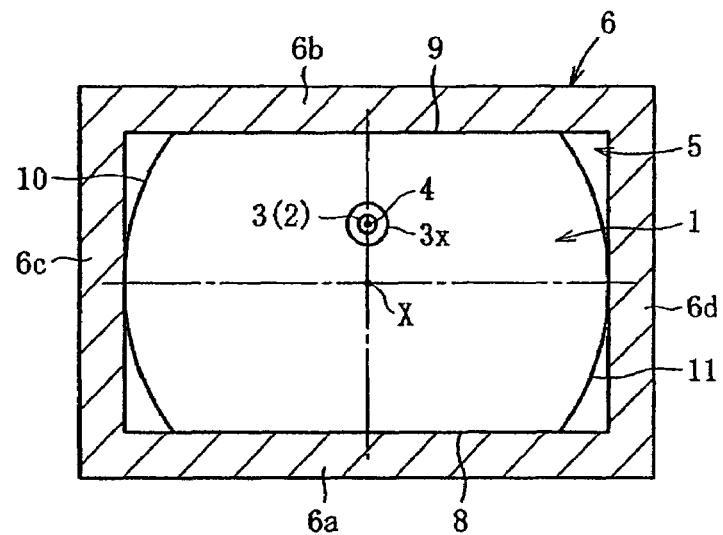
FIG. 3 is a front view of the vertical cross-section illustrating the glass capillary tube for holding optical fiber related to the first embodiment.
Figure 4:
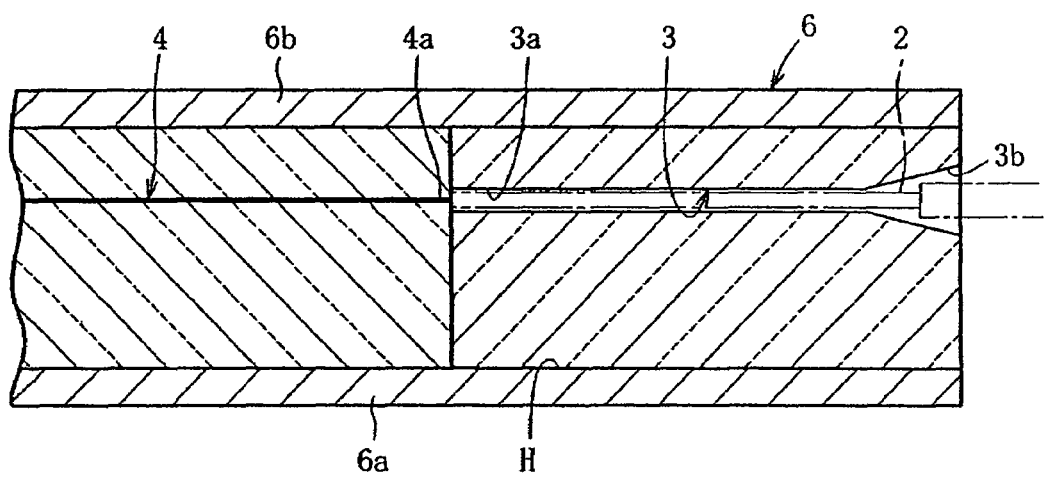
FIG. 4 is a side view of a vertical cross-section illustrating the glass capillary tube for holding an optical fiber related to the first embodiment.

As illustrated in FIG. 3 (FIG. 1), the cross-sectional shape of the optical waveguide device 5, cut at right angle to the optical axis, is a rectangle, its dimension in the height-wise direction is the same as the dimension in the height-wise direction of the glass capillary tube 1, and its dimension in the widthwise direction is the same or approximately the same as the maximum dimension in the widthwise direction of the glass capillary tube 1. In addition, the rear end 4a of the core 4 within the optical waveguide device 5 is formed in a position at the center of the widthwise direction and deviated toward the top-surface side (upper side) from the center of the height-wise direction. As illustrated in FIGS. 3 and 4, the rear end 4a of the core 4 within the optical waveguide device 5 and the insertion hole 3 of the glass capillary tube 1 are arranged in approximately a straight line under the condition where the glass capillary tube and the optical waveguide device are housed within the casing 6, or in other words, where the glass capillary tube 1 together with the optical waveguide device 5 are provided on the base plane H of the casing 6, and the core of the optical fiber 2 held within the insertion hole 3 of the glass capillary tube 1 and the core 4 of the optical waveguide device 5 are in a state of approximate alignment. Even when they are not in alignment, the largest deviation will be about 50 μm and alignment operation can be easily performed by slight adjustment. Therefore, the dimension from the bottom surface of the optical waveguide device 5 to the rear end 4*a* (optical axis) of the core 4 in the height-wise direction is the same as the dimension from the first flat portion 8 of the glass capillary tube 1 to the insertion hole 3 (the central axis thereof) in the height-wise direction.

Therefore, the glass capillary tube 1 and the optical waveguide device 5 are provided such that the central axis of the insertion hole 3 of the glass capillary tube 1 is approximately aligned with the optical axis of the rear end 4*a* of the core of the optical waveguide device 5, and moreover the first flat portion 8 and the second flat portion 9 of the glass capillary tube 1 are provided such that the top surface and the rear surface of the optical waveguide device 5 are at the same position in the height-wise direction and are approximately flush with each other. The four exterior sides of the glass capillary tube 1 and the optical waveguide device 5 are covered by the bottom wall 6*a*, the top wall 6*b* and two side walls 6*c*, 6*d* of the casing 6. More specifically, the first and second flat portions 8, 9 of the glass capillary tube 1 and the top and bottom of the optical waveguide device 5 respectively face the interior surfaces of the bottom wall 6*a* and top wall 6*b* of the casing 6, and the first and second partial cylindrical portions 10, 11 of the glass capillary tube 1 and the two side surfaces of the optical waveguide device 5 respectively face the interior surface of the two side walls 6*c*, 6*d* of the casing 6. Such opposing surfaces have completely no gap in between, or even when a gap exists, its largest size is approximately 50 μm.

According to the aforementioned structure, since the optical waveguide device 5 has a substantially rectangular cross-section and the rear-surface side end portion of the glass capillary tube 1 which is connected and fixed to the optical waveguide device 5 in a straight line serves as a second flat portion 9, the glass capillary tube 1 and the optical waveguide device 5 can be mounted on the same flat surface (on the base plane H) with stability while being aligned with each other to be connected and fixed. In addition, in the aligning of the glass capillary 1 and the optical waveguide device 5, the handling of these does not become disadvantageous nor inconvenient, and the relative rotation angle around the central axis is not an issue, and thereby the aligning can be easily performed. In the case where the insertion hole 3 of the glass capillary tube 1 and the optical axis 4*a* of the optical waveguide device 5 are mounted on the base plane H while being aligned with each other, a height difference between the second flat portion 9 of the capillary tube 1 and the surface of the optical waveguide device 5 is less likely to occur. Thus, when both the glass capillary tube 1 and the optical waveguide device 5 are packaged with the casing 6, almost no gap is formed therebetween, and saccadic movements caused by the gap are suppressed. With such gap, an improper stress would be generated due to the difference in thermal expansion caused by filling the gap with an adhesive and a problem such as early deterioration would occur due to the generation of improper stress. In the present invention, the gap does not exist, or even when the gap exists, its largest size is approximately 50 μM. Therefore, even when the gap is filled with an adhesive or the like, the amount of adhesive is small and hence disadvantages are less likely to occur.

The glass capillary tube 1 includes the first flat portion 8 that can be stably set on the base plane H, and the insertion hole 3 is formed in a position deviated from the central axis X in the direction perpendicular to the first flat portion 8 as a benchmark such that the optical axis of the optical waveguide device 5 and the central axis of the insertion hole of the glass capillary tube 1 are approximately matched. Therefore, the core 4 of the optical waveguide device 5 and the core of the optical fiber 2 held in the insertion hole 3 of the glass capillary tube 1 can be easily aligned.

In addition, since the glass capillary tube 1 includes the first flat portion 8 and the second flat portion 9, during the skewing process of the end surface thereof, a skewed surface can be accurately formed using either of the flat portions as a benchmark.

Figure 5:
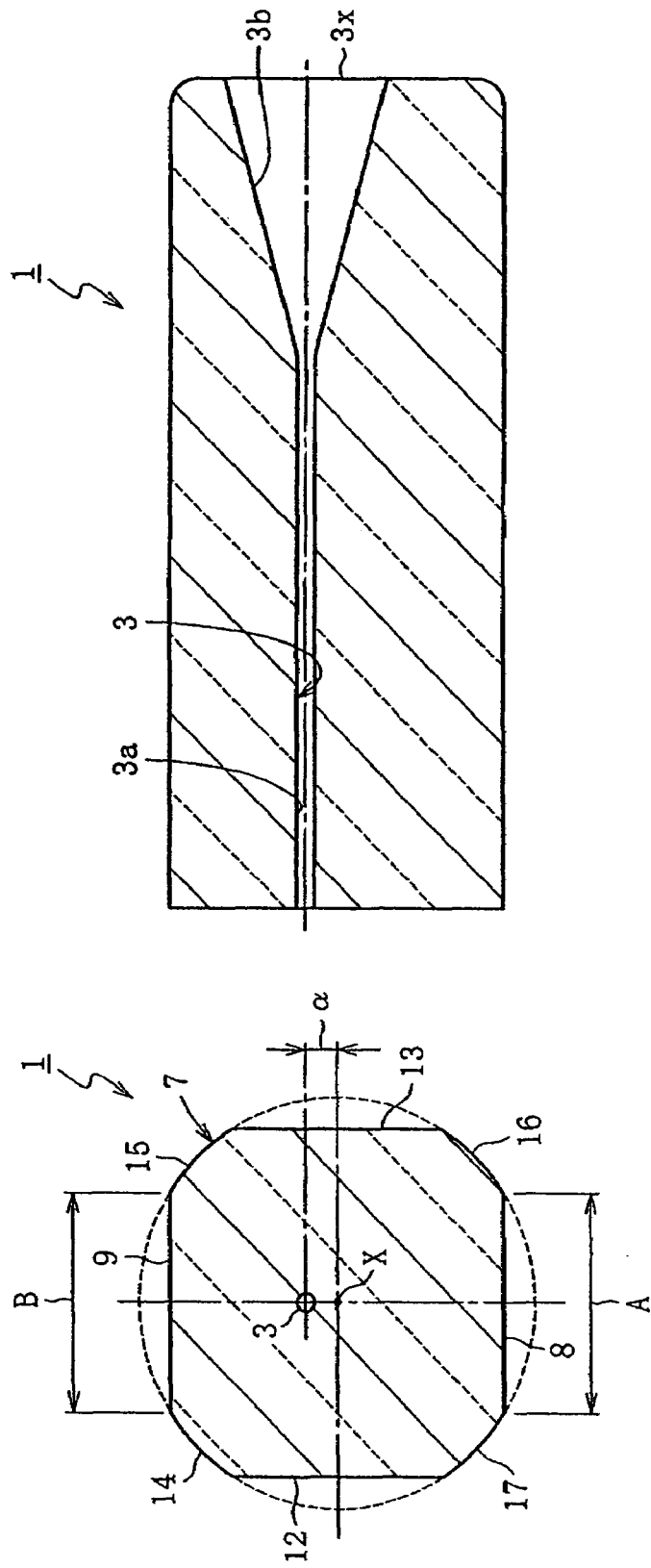
FIG. 5(a) is a front view of a vertical cross-section illustrating a glass capillary tube for holding optical fiber related to a second embodiment of the present invention.
FIG. 5(b) is a side view of the vertical cross-section.

FIG. 5 illustrates a glass capillary tube related to a second embodiment of the present invention, FIG. 5(*a*) is a vertical cross-sectional view in which the glass capillary tube is cut at right angle to the optical axis, and FIG. 5(*b*) is a vertical cross-sectional view in which the glass capillary tube is cut along the optical axis. As illustrated in FIG. 5(*a*), the glass capillary tube 1 related to the second embodiment is different from the glass capillary tube 1 related to the first embodiment such that a third and a fourth flat portions 12, 13 perpendicular to the flat portions 8, 9 are formed on the two sides of the first and the second flat portions 8, 9 in the widthwise direction and in the exterior surface 7. In addition, first to fourth partial cylindrical portions 14, 15, 16, 17 are formed adjacent to and in between all the flat portions 8, 9, 12, 13, respectively. All the partial cylindrical portions 14 to 17 are formed from the single-core central axis X and with the same radius, and the total region (total surface area) of these partial cylindrical portions 14 to 17 covers 20% or more (with upper limit at about 80%) of the entire region (entire surface area) of the exterior surface 7. Further, the insertion hole 3 deviates from the central axis X (in this embodiment, also exits at the center between the first flat portion 8 and the second flat portion 9) by a predetermined dimension a toward the second flat portion 9 side and is formed at the center of the glass capillary tube 1 in the widthwise direction. As illustrated in FIG. 5(*b*), the diameter of the rear end opening portion 3*x* of the flared portion 3*b* in the insertion hole 3 is increased by nine times of that of the front end portion 3*a*.

Figure 6:
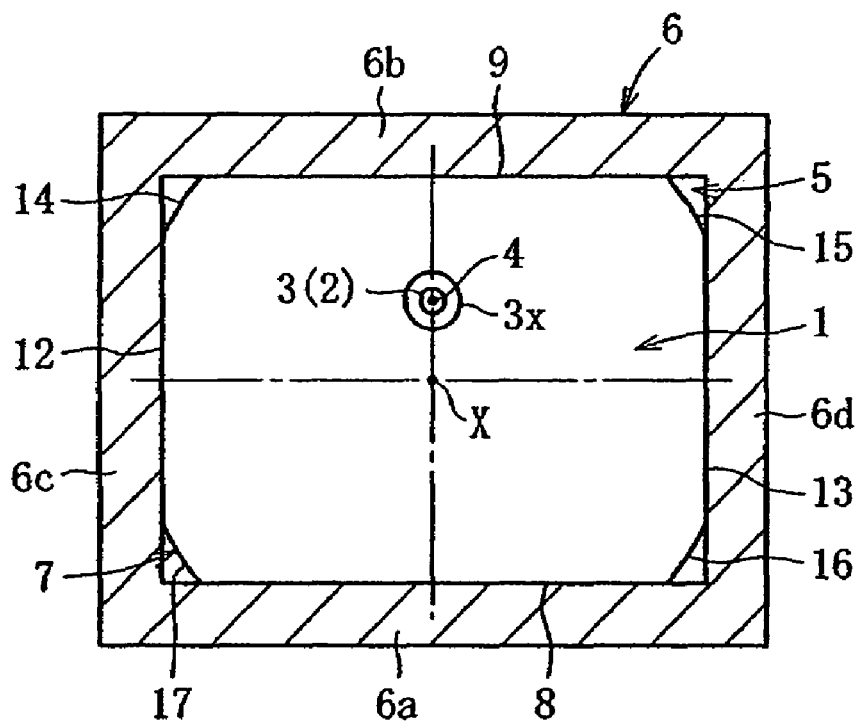
FIG. 6 is a front view of the vertical cross-section illustrating the glass capillary tube for holding optical fiber related to the second embodiment.

As illustrated in FIG. 6, the first to fourth flat portions 8, 9, 12, 13 on the exterior surface 7 of the glass capillary tube 1 face the inner bottom wall 6*a*, the inner top wall 6*b* and two inner side walls 6*c*, 6*d* of the casing 6, respectively, and the four sides of the optical waveguide device 5 also face each inner surface of the casing 6, respectively. Such opposing surfaces have completely no gap in between, or even when a gap exists, its largest size is approximately 50 μm. Therefore, the four exterior surfaces 7 of the glass capillary tube 1 are approximately flush with the four exterior surfaces of the optical waveguide device 5 while the central axis of the insertion hole 3 of the glass capillary tube 1 is approximately matched with the optical axis 4*a* of the optical waveguide device 5. Thus, the glass capillary tube 1 and the optical waveguide device 5 can be packaged with the casing 6 while being connected and fixed in a straight line, with less saccadic movement and with stability. In addition, according to the glass capillary tube 1, a wider adhering area with the optical waveguide device 5 can be ensured. Since the other features are the same as the above described first embodiment, same reference characters are used for the common constituent elements of the two in FIGS. 5 and 6, and their description is omitted.

The glass capillary tube 1 related to the present invention is not limited to the first and second embodiments described above, but can be of various variations as described below.

Figure 7:
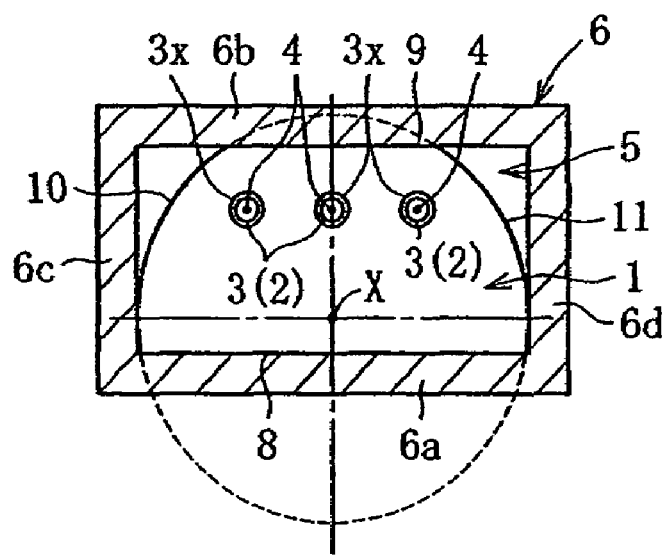
FIG. 7 is a front view of a vertical cross-section illustrating a glass capillary tube for holding optical fiber related to a third embodiment of the present invention.
Figure 8:
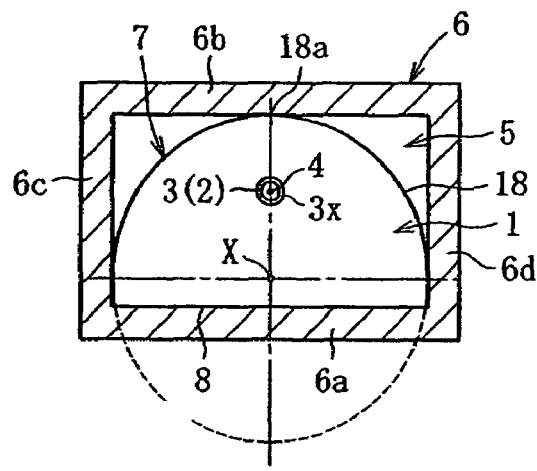
FIG. 8 is a front view of a vertical cross-section illustrating a glass capillary tube for holding optical fiber related to a fourth embodiment of the present invention.
Figure 9:
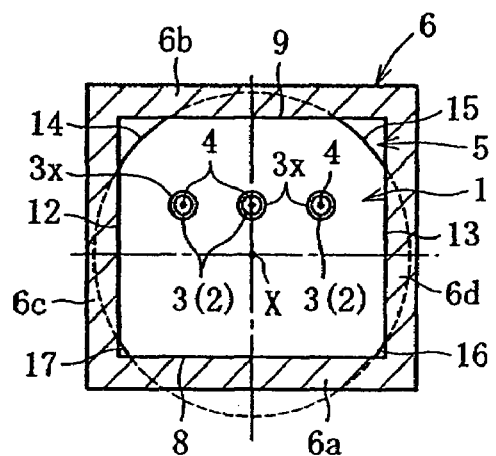
FIG. 9 is a front view of a vertical cross-section illustrating a glass capillary tube for holding optical fiber related to a fifth embodiment of the present invention.
Figure 10A:
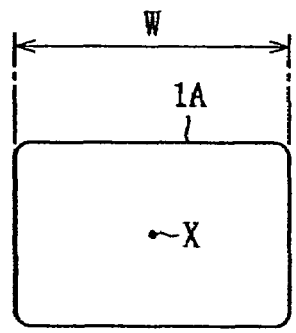
FIGS. 10(a) and (b) are respective vertical cross-sections for describing conventional problems.
Figure 10B:
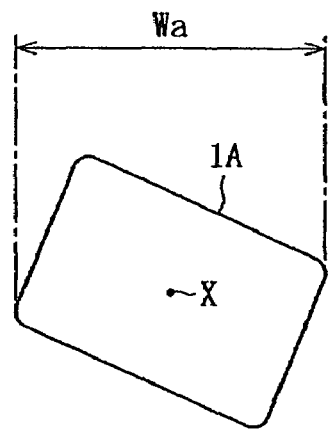

As illustrated in FIG. 7, the insertion hole 3 may be in plurality such as in the drawing. Three insertion holes 3 may be arranged in a direction parallel to the first flat portion 8 (in this case, the plurality of optical axes 4 are also arranged at the corresponding locations in the optical waveguide device 5) or the dimension of the first flat portion 8 may differ from that of the second flat portion 9 in the widthwise direction such as in the drawing, where the dimension of the first flat portion 8 is longer than that of the second flat portion 9 in the widthwise direction. In addition, as illustrated in FIG. 8, the exterior surface 7 may be formed by a single flat portion 8 and a single partial cylindrical portion 18. Alternatively, as illustrated in FIG. 9, in the case where there are four flat portions 8, 9, 12, 13, the dimension of the first flat portion 8 may differ from that of the second flat portion 9 in the widthwise direction and the dimensions of two partial cylindrical portions 14, 15 may differ from those of the other two partial cylindrical portions 16, 17 in the circumferential direction. Although the central axis X of the partial cylindrical portions (10, 11), (18), (14 to 17) on the exterior surface of the glass capillary tube 1 illustrated in FIGS. 7 to 9 is not provided at the center in the height-wise direction, or in other words, the center of the rear-surface side end portion (the first flat portion 8) and the top-surface side end portion (second flat portion 9, end portion 18*a*), the insertion hole 3 deviates from the center in the height-wise direction toward the top-surface side end portions 9, 18*a* side.

What is claimed is:

1. A capillary tube for holding an optical fiber which is adhered and fixed in a straight line to an optical component having a substantially rectangular cross-section perpendicular to an optical axis, which is formed at a position deviated from the center between the top-surface side end portion and the rear-surface side end portion of the exterior surface in the height-wise direction, and in which an insertion hole, into which the optical fiber is inserted and fixed, is formed at a position deviated from the center between the top-surface side end portion and the rear-surface side end portion of the exterior surface in the height-wise direction wherein the top-surface side end portion and the rear-surface side end portion of the exterior surface are formed to be positioned at a same level as a top surface and a rear surface of an exterior surface of the optical component in the height-wise direction, respectively, while the central axis of the insertion hole and the optical axis of the optical component are matched.

2. The capillary tube for holding the optical fiber of claim 1, wherein the rear-surface side end portion of the exterior surface forms a first flat portion and the top-surface side end portion of the exterior surface forms a second flat portion parallel to the first flat portion.

3. The capillary tube for holding the optical fiber of claim 1, wherein the capillary tube is composed of a material with a thermal expansion coefficient of 0 to $80 \times 10^{-7}$/K under an operating temperature range.

4. The capillary tube for holding the optical fiber of claim 1, wherein the capillary tube is composed of a glass material.

5. The capillary tube for holding the optical fiber of claim 4, wherein the capillary tube is produced by a drawing process.

6. The capillary tube for holding the optical fiber of claim 1, wherein the optical component is an optical waveguide device.

7. A capillary tube for holding an optical fiber which is connecting and fixed in a straight line to an optical component having a substantially rectangular cross-section perpendicular to an optical axis and in which an insertion hole, into which the optical fiber is inserted and fixed, is formed, wherein a top-surface side end portion and a rear-surface side end portion of an exterior surface are formed to be positioned at a same level as a top surface and a rear surface of an exterior surface of the optical component in a height-wise direction, respectively, while the central axis of the insertion hole and the optical axis of the optical component are matched, at least one of the top-surface side end portion and the rear-surface side end portion of the exterior surface being a flat portion, the flat portion having one or more partial cylindrical portions continuously connected thereto, all said partial cylindrical portions being formed relative to a single central axis and with the same radius, and the insertion hole being formed in a position deviated from the central axis in the height-wise direction.

8. The capillary tube for holding the optical fiber of claim 7, wherein the insertion hole is formed at a position deviated from the center between the top-surface side end portion and the rear-surface side end portion of the exterior surface in the height-wise direction.

9. The capillary tube for holding the optical fiber of claim 7, wherein the rear-surface side end portion of the exterior surface serves as a first flat portion and the top-surface side end portion of the exterior surface serves as a second flat portion parallel to the first flat portion.

10. The capillary tube for holding the optical fiber of claim 7, wherein the capillary tube is composed of a material with a thermal expansion coefficient of 0 to $80 \times 10^{-7}$/K under an operating temperature range.

11. The capillary tube for holding the optical fiber of claim 7, wherein the capillary tube is composed of a glass material.

12. The capillary tube for holding the optical fiber of claim 7, wherein the optical component is an optical waveguide device.

13. A connecting structure for an optical component which is formed by adhering and fixing in a straight line an optical component having a rectangular cross-section perpendicular to an optical axis, which optical axis is formed at a position deviated from the center between a top-surface side end portion and a rear-surface side end portion of the exterior surface of the optical component in the height-wise direction, and a capillary tube for holding an optical fiber, in which an insertion hole, into which the optical fiber is inserted and fixed, is formed, at a position deviated from a center between a top-surface side end portion and a rear-surface side end portion of the exterior surface of the capillary tube in the height-wise direction wherein the optical axis of the optical component and the central axis of the insertion hole of the capillary tube for holding the optical fiber are matched and the top surface and the rear surface of the exterior surface of the optical component are connected to the stop-surface side end portion and the rear-surface side end portion of the exterior surface of the capillary tube for holding the optical fiber, respectively, so as to be positioned at the same level in a height-wise direction.

14. The connecting structure for the optical component of claim 13, wherein the periphery of the optical component and the capillary tube for holding the optical fiber is covered with a casing.

15. The connecting structure for the optical component of claim 13, wherein the optical component is an optical waveguide device.

* * * * *